United States Patent [19]

Watanabe

[11] 4,318,646
[45] Mar. 9, 1982

[54] TAPPING MACHINE
[75] Inventor: Yasuhiko Watanabe, Nagoya, Japan
[73] Assignee: Brother Kogyo Kabushiki Kaisha, Nagoya, Japan
[21] Appl. No.: 136,715
[22] Filed: Apr. 2, 1980
[30] Foreign Application Priority Data Apr. 16, 1979 [JP] Japan .............................. 54-50242[U]

[51] Int. Cl.³ ............................................. B23B 47/24
[52] U.S. Cl. ....................................... 408/6; 318/473; 408/710
[58] Field of Search ............................ 408/6, 11, 710; 318/471, 472, 473

[56] References Cited

U.S. PATENT DOCUMENTS 2,397,974  4/1946  Morrow et al. ................... 408/11 X
3,187,248  6/1965  Carolin ................................. 318/473
3,720,135  3/1973  Merner et al. ..................... 408/11 X Primary Examiner—Z. R. Bilinsky
Attorney, Agent, or Firm—Browdy and Neimark

[57] ABSTRACT

A tapping machine having a spindle which is moved reciprocally, i.e., in advancing and retracting direction while being rotated forwardly and backwardly for forming a female screw in a work with a screw tap attached at one end thereof. The machine is provided with driving means including a reversible electric motor, position sensing means for generating a sensing signal when the spindle is moved in advancing direction from a start position so far as a predetermined position, and temperature sensing means for generating a sensing signal when the temperature of the electric motor has risen exceeding a predetermined value. The machine normally repeats a working cycle wherein the spindle is moved in advancing direction from the start position while being rotated in forward direction until it is retracted to the start position soon after a sensing signal from the position sensing means has been generated. The operation of the spindle is continued, even when a sensing signal from the temperature sensing means is generated in the course of the advance-movement of the spindle until the current working cycle is finished. And a succeeding working cycle is prevented from being commenced until the sensing signal from the temperature sensing means is ceased.

9 Claims, 5 Drawing Figures

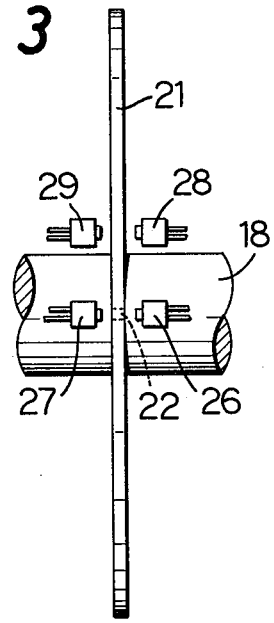
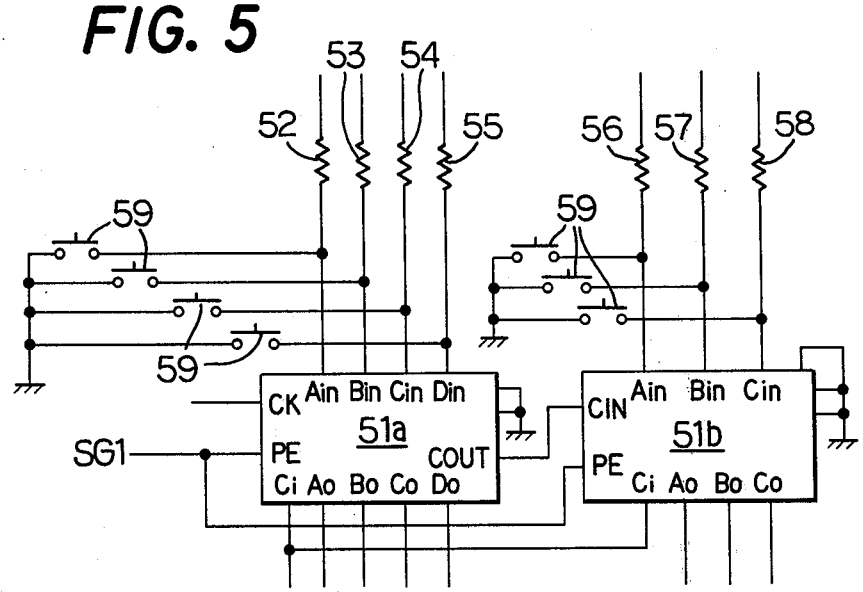

FIG. 4

TAPPING MACHINE

BACKGROUND OF THE INVENTION

This invention relates to a tapping machine wherein a spindle carrying a screw tap is reciprocated while being rotated to form a female screw in a work, and more particularly to a tapping machine capable of halting the drive of an electric motor, which is to drive the spindle, when the temperature of the motor has risen exceeding a predetermined value.

As tapping machine of this kind, one wherein the motor is halted or stopped immediately after the temperature of the motor has exceeded during the tapping operation a predetermined value, and another wherein the motor is reversely rotated soon after the taking place of the same situation for withdrawing the spindle to the start position or original position accompanied by the complete stoppage of the motor, are well known.

In the former machine the motor is halted with the screw tap being engaged with the work, the motor is therefore obliged to meet with a very large torque when the motor is re-driven after it has been cooled, sometimes leading to a complete incapability of driving. It often necessitated the machine operator to remove the work from the screw tap and to return the spindle to the original position. In such an instance the screw tap must be engaged again with the work which has been machined midway for finishing the tapping operation. Such re-engagement of the screw tap and the work in the middle of the machining is very difficult, so an exact female screw forming is next to impossible. It is a great disadvantage of the former prior art.

The latter one is similarly disadvantageous in its difficulty of rendering the screw tap accurately engage again with the half formed female or internal thread. This is also far from being a satisfactory tapping machine.

SUMMARY OF THE INVENTION

The primary object of this invention is to eliminate the above-mentioned disadvantages of the conventional art.

A preferred embodiment of a tapping machine in accordance with this invention comprises a spindle carrying a screw tap (hereinafter simply called a tap) on one end thereof which is disposed reciprocatively while being rotated, driving means including an electric motor for driving the spindle, position sensing means for generating a sensing signal when the spindle has been moved in advancing direction from the original position thereof to a predetermined position, temperature sensing means for generating a sensing signal when the temperature of the electric motor (hereinafter simply called a motor) has risen exceeding a predetermined value, a driving circuit connected to the driving means for driving the motor, and control means for controlling the driving circuit upon receiving the sensing signal from the temperature sensing means.

The spindle in this embodiment repeats such a kind of motion as a working cycle, wherein it is advanced while being rotated at the same time in the forward direction before it is retracted to the original position, while being backwardly rotated, soon after receiving a signal from the position sensing means. And the spindle in this embodiment continues its advancing operation, even when the signal from the temperature sensing means is generated in the course of advancing in a working cycle, due to a controlling command from the control means, until the working cycle in progress comes to an end, and is prevented from entering a next working cycle operation until the signal from the temperature sensing means is ceased.

Even when the temperature of the motor rises in the course of a working cycle of tapping operation exceeding a predetermined value, which is set lower than the temperature at which the motor is resistible, the working cycle is continued until it is finished, and a succeeding working cycle is prevented from starting until the temperature of the motor is cooled down to below the predetermined value. This ensures the elimination of the conventional disadvantages to guarantee the formation of precisely tapped holes as desired, while protecting the motor from being overheated.

BRIEF DESCRIPTION OF THE DRAWINGS

FIG. 3 is a side view of the rotary plate;

FIG. 4 is a general block chart of an electric circuit in the machine; and

FIG. 5 is a partially enlarged block chart of the electric circuit.

DETAILED DESCRIPTION OF AN EMBODIMENT

An embodiment of this invention realized in a safety device for a tapping machine will be described with reference to the appended drawings.

Figure 1:
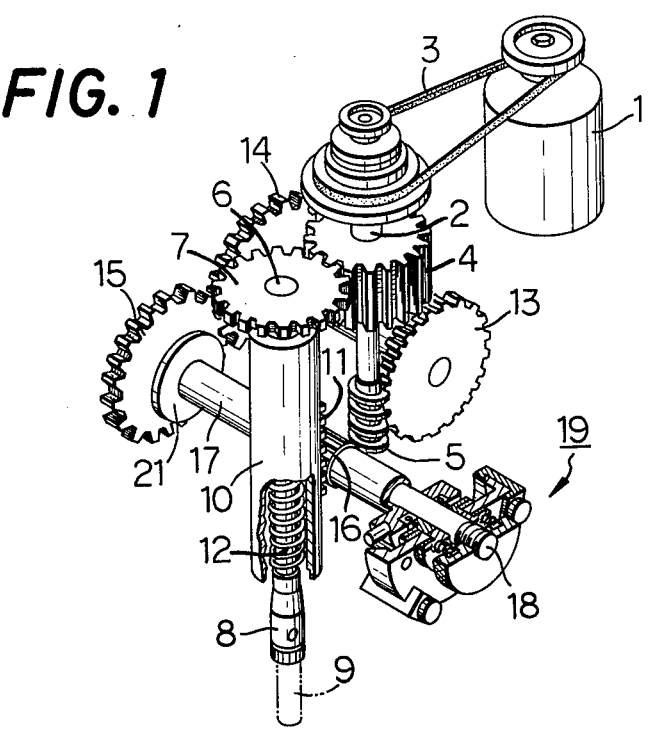
FIG. 1 is a perspective view of an essential part of an embodiment of a tapping machine incorporating the invention in it, partially broken away.

A reversible electric motor 1 which is mounted on a frame (not shown) of a tapping machine is drivingly connected to a driving shaft 2 via a belt 3. At the almost middle part of the driving shaft 2 a wide gear 4 is secured, and on the lower end thereof a worm 5 is secured. A spindle 6 is rotatable through meshing engagement between a spindle gear 7 mounted on the upper end thereof and the wide gear 4 on the driving shaft 2, and a tap chuck 8 disposed on the lower end in FIG. 1 of the spindle 6 holds a tap 9 used for tapping operation. On the outer surface of a quill or spindle sleeve 10, which rotatably supports the spindle 6 and is axially movably carried by the frame, a rack 11 is formed. Inside the quill 10 an anti-backlash spring 12 is disposed so as to be wound about the spindle 6.

A worm wheel 13 meshed with the worm 5 on the driving shaft 2 rotates a rotary shaft 18 by way of gears 14 and 15. A pinion shaft 17 of cylindrical form is provided with a pinion 16 which is meshed with the rack 11 on the quill 10 and operatively connected with the rotary shaft 18 by way of a clutch 19 for separating the connection when an excessive torque is applied on the tap 9. When the motor 1 is forwardly rotated the pinion shaft 17 is, owing to the gear ratio between the gears 14 and 15, counterclockwise rotated within a sphere or limit of one rotation for causing the quill 10 to perform an advancing or descending movement, and at the same time the spindle 6 is forwardly rotated, which makes the tap 9 carry out a tapping operation in a pre-bored hole in a work. A backward rotation of the motor 1 causes on the contrary the quill 10 to be ascended or returned to the original position accompanied by a backward rotation of the spindle 6, which makes the tap 9 to be withdrawn from the work for finishing one cycle of tapping operation.

Explanation on a device for detecting the amount of movement of the tap 9 in its reciprocation movement, i.e., upward and downward movement thereof, will be made next.

Figure 2:
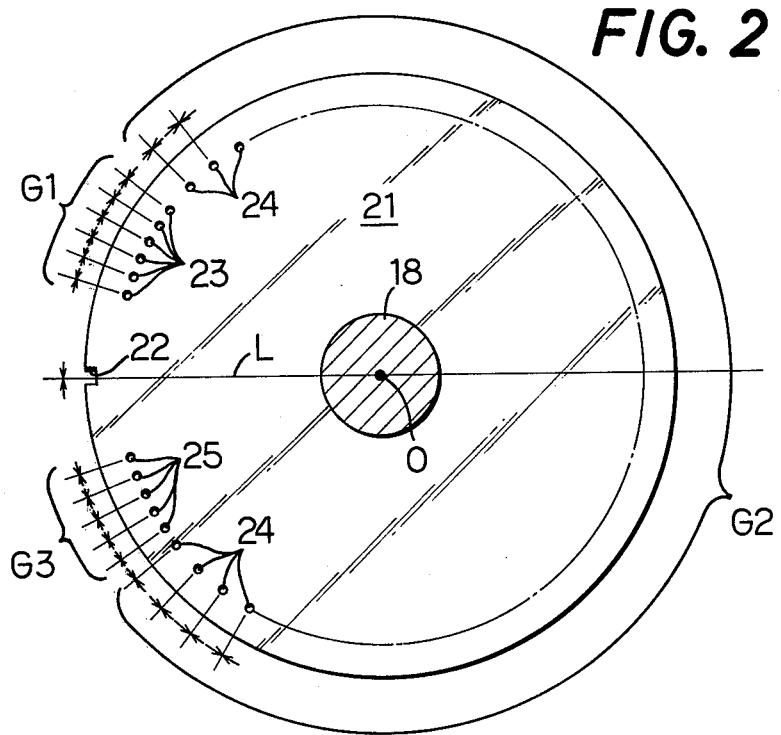
FIG. 2 is an elevational view of a rotary plate, a part of the machine.

A rotary plate 21 of circular form secured to the rotary shaft 18 is provided with a notch 22 formed on one portion of the circumferential surface thereof for sensing the original position, that is the uppermost position, of the tap 9. Starting from a position which is by the center angle 18.5° away in the clockwise direction from a base line L in FIG. 2, linking the notch 22 and the center O of the rotary plate 21, six through-holes called a first hole 23 are formed on one circle concentrical with the rotary plate 21 with an equal angular distance of 4°, which constitute a first group $G_1$ of holes for being sensed. Forty one through-holes called a second hole 24, constituting a second group $G_2$ of holes for being sensed, are formed starting from a position on the same circle 6.5° away from the first group $G_1$ and with an equal angular distance of 6.5° from each other. And further five through-holes called a third hole 25 constituting a third group $G_3$ of holes for being sensed, are formed similarly starting from a position 4° away from the second group $G_2$ and with an equal angular distance of 4° from each other.

As shown in FIG. 3, on either side of the rotary plate 21 a light-emitting or luminescent diode (LED) 26 and a photo-transistor 27 are disposed. When the tap 9 is positioned at the uppermost position or the original position the photo-transistor 27 can receive light from the LED 26 through the notch 22 according to the relative position of the three, i.e., the LED 26, the photo-transistor 27 and the notch 22. On either side of the rotary plate 21 another LED 28 and another photo-transistor 29 are disposed in such a manner as to sandwich the rotary plate 21 inbetween and can be aligned or registered with all of the holes 23, 24, 25, which are arranged on the same one circle concentrical with the rotary plate itself, according to rotation of the rotary plate 21. And the LED 28 and the photo-transistor 29 come to a position nearer to the base line L by 4° than the first hole 23 nearest positioned thereto when the tap 9 is positioned at the original position.

The pitch, 6.5° by the center angle, of the second holes 24 belonging to the second group $G_2$ is in this embodiment in agreement with or corresponds to 1 mm of the movement amount of the tap 9 in its ascending or descending motion. As later described, a position sensing circuit $C_2$ performs a computing or operation such that one pulse of the consecutive pulse signals which are produced by the photo-transistor 29 when it senses the light from the LED 28 intermittently through the holes 23, 24, 25, corresponds to the movement amount 1 mm of the tap 9.

One pulse of the pulse signals produced by the photo-transistor 29, when it senses the light from the LED 28 through the holes of the first group $G_1$ and the third group $G_3$, is computed in the position sensing circuit $C_2$ to be larger than the actual movement amount of the tap 9, because the pitch of the holes 23 and 25 in the first group $G_1$ and the third group $G_3$ is smaller than that in the second group $G_2$.

Figure 4:
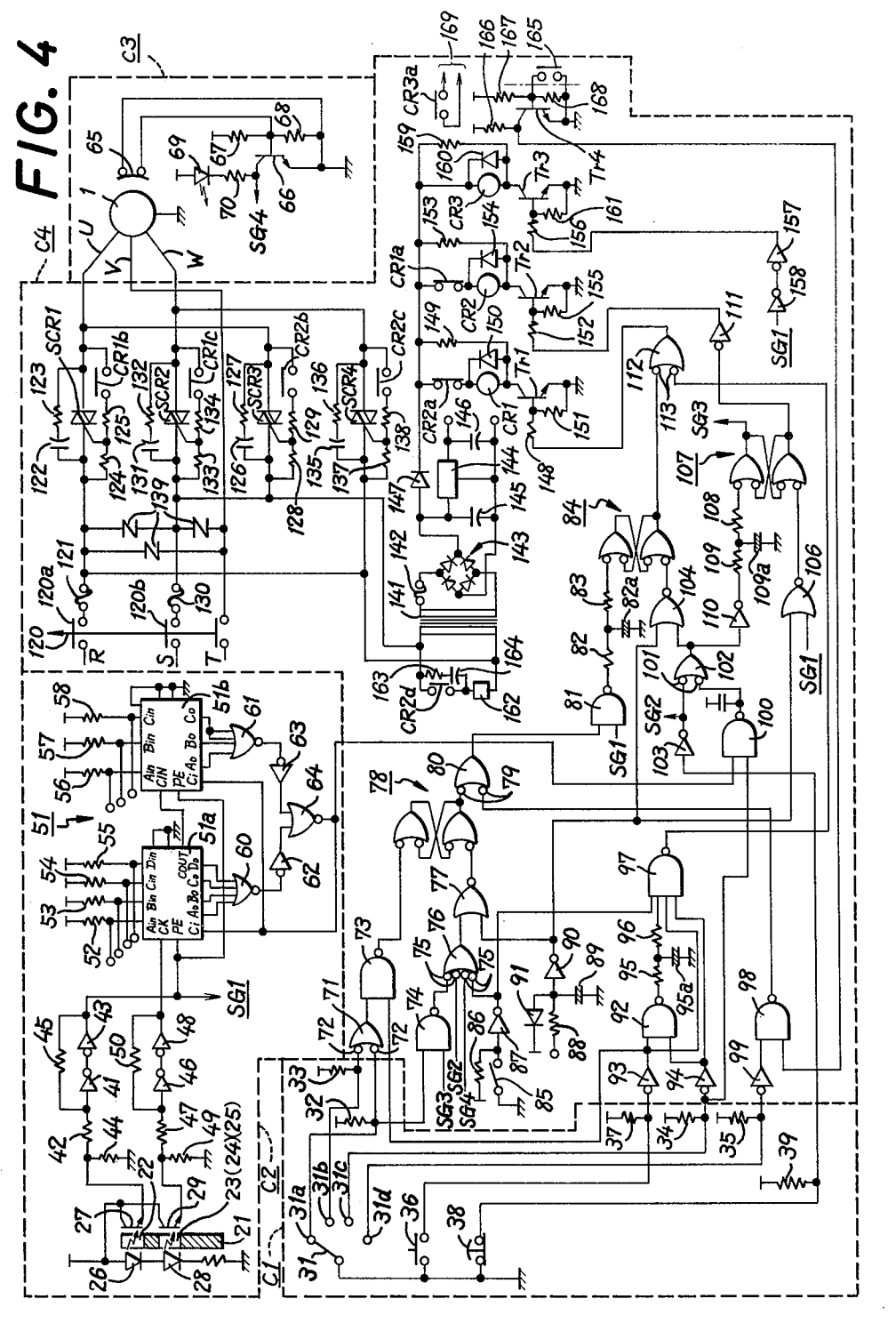

An electric circuit for controlling the operation of the tapping machine of the above-mentioned structure will be described hereunder referring to FIG. 4.

The electric circuit contained in the tapping machine is generally composed of four principal circuits, that is to say, a selective start circuit $C_1$ for starting, upon selecting a machining cycle, the machine, the position sensing circuit $C_2$ for determining the sphere of movement of the tap 9 by sensing the position of the tap 9 in the up-and-down motion thereof, an overheat sensing circuit $C_3$ for sensing an overheated state of the motor 1 of the tapping machine in order to output an electric signal indicating the overheated state, and a drive control circuit $C_4$ which functions as to (a) control the motor 1 in its forward and backward rotation owing to the output signal of the position sensing circuit $C_2$, (b) control the machining cycle of the motor 1 owing to output signal of the selective start circuit $C_1$, and (c) control the motor 1 owing to the output signal of the overheat sensing circuit $C_3$, so that the same may finish the machining cycle in progress even when overheat happens during a machining cycle without suddenly returning the tap 9 to the original position due to the output signal from the overheat sensing circuit $C_3$ and may be prevented from entering the next machining cycle.

The selective start circuit $C_1$ comprises a rotary switch 31, with one end thereof being earthed or grounded, switchable to a contact for repeating operation 31a, a contact for single operation 31b, a contact for inching operation 31c, and a contact for interlocking operation 31d which is interlocked with another machine. On each of the output terminals of the rotary switch 31, one of each resistors 32, 33, 34, and 35, which are respectively connected with one end thereof to an output terminal on the plus voltage side, is connected and a closed output terminal outputs a signal of zero voltage (hereinafter called L level), and other open output terminals output a signal of plus voltage (hereinafter called H level) to the later described drive control circuit $C_4$. A starting switch 36 is closed only while the machine operator depresses a push button. A resistor 37 is connected at one end thereof to the starting switch 36 and at the other end to the output terminal on the plus voltage side; only while the starting switch 36 is turned or switched ON an L level signal is input to the drive control circuit $C_4$. An emergency return switch 38 is open only while the push button is depressed. A resistor 39 is at one end thereof connected to the emergency return switch 38 and at the other end to the output terminal on the plus voltage side; and only while the emergency return switch 38 is kept OFF an H level signal is input to the drive control circuit $C_4$.

As to the position sensing circuit $C_2$, a NOT circuit 41 is, via a resistor 42, connected at one end thereof to an emitter terminal of the photo-transistor 27 which is turned ON by the sensing of the light from the LED 26 through the notch 22 in the rotary plate 21, and at the other end, i.e., at the output terminal to a NOT circuit 43. A resistor 44 earthed at one end thereof is connected to the emitter terminal of the photo-transistor 27 at the other end thereof, and a resistor 45 is parallelly connected with a series circuit of the NOT circuits 41 and 43.

A NOT circuit 46 is, via a resistor 47, connected at one end thereof to an emitter terminal of the photo-transistor 29 which is turned ON by the sensing of the light from the LED 28, and at the other end, i.e., at the output terminal, to a NOT circuit 48. A resistor 49 is at one end thereof earthed, and a resistor 50 is parallelly connected with a series circuit of the NOT circuits 46 and 48.

A down counter 51 is composed of a hexadecimal counter 51a and an octal counter 51b, a carry output terminal COUT of the hexadecimal counter 51a being connected to a carry input terminal CIN of the octal counter 51b. Resistors for setting 52, 53, ... 57, and 58 are, as can be seen in FIG. 4, connected at respective one end thereof to a respective input terminal for setting Ain, Bin, Cin and Din in each of both counters 51a, 51b, and at the other end to the output terminal on the plus voltage side respectively. As shown in FIG. 5, each of the input terminals for setting Ain, Bin, Cin, and Din is connected to a setting button 59, so a suitable setting operation of the setting buttons 59 allows each of BCD (binary-coded decimal) output terminals Ao, Bo, Co, and Do of respective counter 51a and 51b to be set at the desired value.

On the other hand a carry input terminal CK of the hexadecimal counter 51a is connected to the output terminal of the NOT circuit 48 for being capable of, when a pulse from the photo-transistor 29 is generated owing to a rotation of the rotary plate 21, catching the rising of the pulse signal to perform subtraction from the aforementioned set value. Each preset input terminal PE of the hexadecimal and octal counters 51a, 51b is connected to the output terminal of the NOT circuit 43 for being responsive to the rising of the output signal $SG_1$ from the photo-transistor 27 so as to preset each of the counters 51a, 51b.

Furthermore, the BCD output from each of the counters 51a, 51b is, via respective NOR circuit 60 and 61 as well as respective NOT circuit 62 and 63, input to a NOR circuit 64. The output from this NOR circuit 64 is input to the later described drive control circuit $C_4$. The output terminal of the NOR circuit 64 is connected to the input terminal $C_i$ of each of the counters 51a, 51b for maintaining the value of the BCD output of each of the counters 51a, 51b, when the output of the NOR circuit 64 has reached H level.

The explanation will be proceeded to the overheat sensing circuit $C_3$. A temperature sensor 65, such as a resistor for temperature sensing, a thermister, a thermocouple, etc., is disposed in the motor 1, whose both terminals are connected between base and emitter of a transistor 66. As to the temperature sensor 65 in this embodiment, one which is capable of turning the transistor 66 ON at a lower level than the resistible temperature for the motor 1 is selected. Numerals 67, 68 designate a biasing resistor for the transistor 66. It is also possible to replace a thermal relay for the above-mentioned combinstion of the temperature sensor 65 and the transistor 66. An LED 69 is connected, via a resistor 70, to the collector terminal of the transistor 66, for being luminated in resonse to the ON turning of the transistor 66 so as to inform or give a warning of the motor 1 being in transit to an overheating state. An output signal $SG_4$ from the collector terminal of the transistor 66 is input to the later described drive control circuit $C_4$. Therefore, the output signal $SG_4$ is input, at H level when the motor 1 is driven in the normal state and at L level when the motor 1 has been transited to an overheated state to the drive control circuit $C_4$.

As to the drive control circuit $C_4$, an OR circuit 71 is connected, at each of the two input terminals thereof, to the contact for repeating operation 31a and the contact for single operation 31b of the rotary switch 31 respectively via a NOT circuit 72, and the output signal thereof is input to a NAND circuit 73.

A NAND circuit 74 is connected at one input terminal thereof to the contact for repeating operation 31a, the output thereof is input to an OR circuit 76 via a NOT circuit 75. The OR circuit 76 is connected to one input terminal of a NOR circuit 77. To the OR circuit 76 an output signal $SG_4$ of the overheat sensing circuit $C_3$ and another later described output signal $SG_2$ are input via a NOT circuit 75. A flip-flop circuit 78 is connected with each of the two input terminals thereof to the output terminal of the NAND circuit 73 and to the output terminal of the NOR circuit 77, the output thereof is input, via a NOT circuit 79, to an OR circuit 80. The output of the OR circuit 80 and an output signal $SG_1$ of the position sensing circuit $C_2$ are input to a NAND circuit 81. The output from NAND circuit 81 is, via resistors 82, 83, input to an input terminal of a flip-flop circuit 84 on the next step. An integration circuit built up of a capacitor 82a, one end thereof being earthed, and the resistor 82 functions to input the output from the NAND circuit 81, after having delayed by a predetermined duration of time, to the flip-flop circuit 84.

A gear cover switch 85 is at one end thereof earthed and at the other end connected to a resistor 86, being mounted on the machine frame vis-à-vis a not-shown gear cover which covers the gears 14, 15. The switch 85 is in the normal state being ON and is turned OFF only when the gear cover is removed. When the switch 85 is switched ON an L level signal is input to a NOT circuit 87; and an output signal of H level caused by the above L level signal is input to the OR circuit 76 by way of the NOT circuit 75. A resistor 88 is at one end thereof is connected to the output terminal on the plus voltage side of a constant voltage circuit of direct current, which is operative with a closing of a later described alternative power source switch 120, and is at the other end earthed via a capacitor 89. And the resistor 88 and the capacitor 89 constitute an integration circuit. The integration circuit reverses the output of a NOT circuit 90 after the lapse of a predetermined time duration according to time constant thereof, from H level to L level before inputting it to the NOR circuit 77. Numeral 91 designates a diode.

A NAND circuit 92 is connected with each of the two input terminals, via NOT circuits 93 and 94 respectively, to the starting switch 36 and the contact for inching operation 31c, the output signal thereof being input, via resistors 95 and 96, to a NAND circuit 97 on the next step. An integration circuit built up of a capacitor 95a, which is earthed at one end thereof, and the resistor 95 functions to delay the output from the NAND circuit 92 by a predetermined time duration. The NAND circuit 97 receives the output signal from the NOT circuits 87, 93, and 94 respectively as an input thereto. Besides, an output signal of the NOT circuit 93 is input also to the NAND circuit 73.

A NAND circuit 98 is connected, via a NOT circuit 99, at one input terminal therof to the contact for interlocking operation 31d which is interlocked with the external starting signal, and the output thereof is input, via the NOT circuit 79, to the OR circuit 80.

A NAND circuit 100 is connected at each of the two input terminals respectively to the contact for inching operation 31c of the rotary switch 31 and to the output terminal of the NOR circuit 64 of the position sensing circuit $C_2$, and the output thereof is input, via a NOT circuit 101, to an input terminal of an OR circuit 102. The other input terminal of the OR circuit 102 is connected, via the NOT circuits 101, 103 to the emergency return switch 38. The output signal $SG_2$ of the NOT circuit 103 is input, via the NOT circuit 75, to the OR circuit 76. A NOR circuit 104 receives the output of the OR circuit 102 and the output of the NOT circuit 90 as inputs thereto, and the output thereof is input to the other input terminal of the flip-flop circuit 84.

A NOR circuit 106 receives the output of the NOT circuit 90 and the output signal $SG_1$ of the NOT circuit 43 in the position sensing circuit $C_2$ as inputs thereto, and the output thereof is input to one input terminal of a flip-flop circuit 107. To the other input terminal of the flip-flop circuit 107 is connected, via resistors 108, 109 and a NOT circuit 110, the output terminal of the OR circuit 102. An integration circuit build up of a charging capacitor 109a, which is earthed at one end, and the resistor 109 functions to input the output from the NOR circuit 110, after having delayed by a predetermined time duration, to the flip-flop circuit 107. The output signal $SG_3$ from one output terminal of the flip-flop circuit 107 is input to the NAND circuit 74; and the other output terminal is connected to a NOT circuit 111. An OR circuit 112 receives at each of the two input terminals thereof, respectively via a NOT circuit 113, the output of the flip-flop circuit 84 and that of the NAND circuit 97.

Numeral 120 designates a switch of a triphase current source for supplying power by way of the three phases U, V, & W to the motor 1. A thyristor $SCR_1$ is connected at one end thereof, via a fuse 121, to a contact 120a of the switch 120 of triphase current source and at the other end to a U-phase wire of the motor 1. A series circuit of a capacitor 122 and a resistor 123 and another series circuit of resistors 124, 125 and a normal open contact $CR_{1b}$ of a later described electromagnetic relay $CR_1$ are parallelly connected to the thyristor $SCR_1$. A gate terminal of the thyristor $SCR_1$ is connected to the midway of the resistors 124, 125 for constituting a power supplying circuit to drive the motor 1 in the forward direction. A U-phase wire of the motor 1 is, just like the above-mentioned, connected to a contact 120b of the switch 120 of triphase current source by way of the power supplying circuit for backward directional driving which is built up of a thyristor $SCR_3$, a capacitor 126, resistors 127, 128, and 129 and a normal open contact $CR_{2b}$ of an electromagnetic relay $CR_2$. Numeral 130 designates a fuse. Between a W-phase wire of the motor 1 and a contact 120b of the switch 120 of the power source as well as between the W-phase wire and the contact 120a are respectively connected the power supplying circuit for the forward directional drive and that for the backward directional drive, which are respectively built up of a thyristor $SCR_2$, capacitor 131, resistors 132, 133, and 134 and a later described normal open contact $CR_{1c}$ of a relay $CR_1$ as well as of a thyrister $SCR_4$, a capacitor 135, resistors 136, 137, and 138 and a normal open contact $CR_{2c}$ of a relay $CR_2$. Numeral 139 designates a varistor.

A transformer 141 is supplied to the primary side power from two phases out of the triphase current source, and a rectifying circuit 143 is connected between the output terminals thereof by way of a fuse 142. A regulator 144 is connected between the output terminals of the rectifying circuit 143. The regulator 144 and capacitors 145, 146 constituet a DC constant voltage circuit, the direct current therefrom being supplied as operative power source to the resistor 88 of the above-mentioned integration circuit and the down counter 51 and further to the transistor 66, etc. Numeral 147 designates a diode.

A transistor $T_{r1}$ is connected at the base terminal thereof, via a resistor 148, to the output terminal of the OR circuit 112 and to the collector terminal the diode 147 by way of a resistor 149. To the resistor 149 a series circuit built up of the relay $CR_1$ and a normal close contact $CR_{2a}$ of the later described relay $CR_2$ is parallelly connected. Numeral 150 designates a diode parallelly connected to the relay $CR_1$ and numeral 151 designates a resistor connected between the base and emitter of the transistor $T_{r1}$.

A transistor $T_{r2}$ is connected, via a resistor 152, to the output terminal of the NOT circuit 111, the collector thereof being connected via a resistor 153 to the diode 147. To the resistor 153 a series circuit made of the relay $CR_2$ and a normal close contact $CR_{1a}$ of the relay $CR_1$ is parallelly connected. Numeral 154 designates a diode parallelly connected to the relay $CR_2$ and numeral 155 designates a resistor connected between the base and emitter of the transistor $T_{r2}$.

A transistor $T_{r3}$ is at the base terminal thereof connected, via a resistor 156 and NOT circuits 157 and 158, to the output terminal of the NOT circuit 43 of the position sensing circuit $C_2$, the collector terminal of the transistor $T_{r3}$ being connected to the diode 147 by way of a resistor 159. A relay $CR_3$ is parallelly connected to the resistor 159; a diode 160 is parallelly connected to the relay $CR_3$. Between the base and emitter of the transistor $T_{r3}$ a resistor 161 is connected.

An electromagnetic counter 162 is connected, via the normal open contact $CR_{2d}$ of the relay $CR_2$, to between the two input terminals of the transformer 141 for the purpose of counting the number of finished articles. Numerals 163 and 164 respectively designate a resistor and a capacitor.

A transistor $T_{r4}$ is connected at the collector terminal thereof to the other input terminal of the NAND circuit 98, and the base terminal of the transistor $T_{r4}$ receives an input from outside, for example, in case wherein the tapping machine is being used interlockingly with some other machine or machines, an output from the interlocked machine as an input signal thereto. A contact 165 for receiving the input from outside is normally OFF, and turns the transistor $T_{r4}$ OFF only when some signal is input from the interlocked machine. Numerals 166, 167, and 168 respectively designate a biasing resistor for the transistor $T_{r4}$.

A connecting wire 169 which is connected between the two terminals of a normal open contact $CR_{3a}$ of the relay $CR_3$ is for delivering an output signal at the finishing of each working cycle.

As to the function or operation of the safety device of a tapping machine thus structured a detailed description will follow hereunder.

When the tapping machine is operated under a repeating operation condition, that is, performing repeated working cycles, the switch 120 of the triphase current source is turned ON at first so as to supply direct current for operation toe ach of the four principal circuits $C_1$, $C_2$, $C_3$, and $C_4$. And the rotary switch 31 is operated to set it at the contact 31a for repeating operation. As the movable sphere of the tap 9 from the uppermost position downwards for machining a female screw in a pre-bored hole in a work is determined at 47 mm, each of the set buttons 59 of the down counter 51 is so operated as to set the BCD output terminals Ao, Bo, Co, & Do of the hexadecimal counter 51a to be H, H, H, L level at the output and the BCD output terminals Ao, Bo, & Co of the octal counter 51b to be L, L, H level at the output. By the above-mentioned procedures the output of the flip-flop circuit 78 is set at H level, and the output of the flip-flop 84 is, via the NAND circuit 81, also set at H level. On the other hand the NAND circuit 97 outputs a H level output. The output of the OR circuit 112 is set at L level. The output signal $SG_1$ comes out at H level, as the photo-transistor 27 is kept ON, and the output of the flip-flop circuit 107 which is input to the NOT circuit 111 is set at H level. The relays $CR_1$ and $CR_2$ in the power supplying circuits for the forward and backward rotation and therefore not energized yet, consequently the normal open contacts $CR_{1b}$, $CR_{1c}$, $CR_{2b}$, and $CR_{2c}$ being maintained open. The motor 1 is, as a result, still stationary.

When the starting switch 36 is depressed for driving the motor 1, i.e., beginning the tapping operation, the output from the starting switch 36 is changed from H level to L level, causing the output of the NAND circuit 73 to be changed, via the NOT circuit 93, from H level to L level. And the output of the flip-flop circuit 78 is reversed to L level, which output signal reverses in turn the output of the flip-flop circuit 84 to L level by way of the OR circuit 80 and the NAND circuit 81. On the other hand, the output of the NAND circuit 97 is not reversed regardless of the depressing of the starting switch 36, which makes the output of the OR circuit 112 H level, the transistor $T_{r1}$ turn ON, and energizes the relay $CR_1$. The energization of the relay $CR_1$ closes the normal open contacts $CR_{1b}$ and $CR_{1c}$, turns the thyristers $SCR_1$ and $SCR_2$ ON, and begins to supply power to each phase of the wires U, V, & W. The motor 1 begins to forwardly rotate.

Synchronously with the advancing movement, while rotating, of the tap 9, downwards from the original position, the rotary plate 21 begins to rotate within the sphere or limit of one round. The rotating motion of the rotary plate 21 causes the photo-transistor 29 to operate ON and OFF, repeating pulses being thereby generated. The down counter 51 catches the rising of the repeating pulses for subtracting the number of the pulses from the set value in the down counter 51. Although the output signal $SG_1$ becomes L level due to the rotation of the rotary plate 21, the output of the flip-flop circuit 107 is not reversed by that. As the normal close contact $CR_{1a}$ is opened at this stage due to the energization of the relay $CR_1$, the relay $CR_2$ is not energized, thereby preventing the motor 1 from being reversely or backwardly rotated.

When the tap 9 reaches in the downward movement thereof while machining the preset position of 47 mm the down counter 51 catches the rising of the forty seventh pulse of the repeating pulses, the down counter 51 becoming zero, i.e., all of the output terminals Ao, Bo, Co and Do becoming L level, thereby the output of the NOR circuit 64 is reversed from L level to H level. The output of the NAND circuit 100 becomes L level, consequently reversing the output of the OR circuit 102 from L level to H level, via the NOT circuit 101, which output of H level reversing the output of each of the flip-flops 84 and 107. This reversion of each output turns the transistor $T_{r1}$ OFF, deenergizes the relay $CR_1$, and turns ON the transistor $T_{r2}$ on the one hand for energizing the relay $CR_2$. This causes the normal open contacts $CR_{1b}$ and $CR_{1c}$ to be opened while causing the normal open contacts $CR_{2b}$ and $CR_{2c}$ to be closed, which makes the power supplied to the motor 1 reverse in its phase. The reverse or backward rotation of the motor 1 is followed by the ascending or retracting movement of the tap 9 which is simultaneously rotated in the reverse direction. At this stage the output signal $SG_3$ of the flip-flop circuit 107 is reversed so as to input a H level output signal to the NAND circuit 74; the output from the NAND circuit 74 is not reversed by that input signal, keeping the output from the flip-flop circuit 78 at the previously set L level.

As soon as the tap 9 has been returned upward to the original uppermost position, the output signal $SG_1$ becomes H level followed by the preset of the down counter 51, changing the output of the NOR circuit 64 from H level to L level.

The output of the NOR circuit 106 which has been input the output signal $SG_1$ of H level becomes L level, reversing the output of the flip-flop circuit 107, turning the transistor $T_{r2}$ OFF, and consequently suspending the power supplying circuit for driving the motor 1 backwardly. The NAND circuit 81 is at the same time input the output signal $SG_1$ of H level for being reversed in its output from H level to L level, which causes the flip-flop circuit 84 to be reversed from H level to L level and the transistor $T_{r1}$ to be turned ON again. The motor 1 begins to be rotated forwardly again due to the reoperation of the power supplying route for the forward directional driving thereof. The tap 9 begins to be descended or advanced again; the tapping machine is in this way put in a repeating cycle operation by being allowed to reciprocate up-and-down, i.e., advancing and retracting.

If and when the motor 1 enters, while the machine is carrying out tapping operation with the tap 9, overheated condition such that the temperature reaches the predetermined value which is set lower than the temperature at which the motor 1 is resistible, the resistance of the temperature sensor 65 increases to turn the transistor 66 ON, illuminate the LED 69, and reverse the output of the output signal $SG_4$ therefrom, from H level to L level. The output of the OR circuit 76 is changed from L level to H level, and the output of the flip-flop circuit 78 is reversed from L level to H level for being maintained in that state. The output of the NAND circuit 81 becomes H level due to the L level signal caused by the H level signal from the flip-flop circuit 78 and the L level signal of the output $SG_1$, and the same output is input, through the resistors 82, 83 to the flip-flop circuit 84. The output from the flip-flop circuit 84 is however not reversed; and when the tap 9 has been descended as far as the predetermined value, the flip-flop circuits 84, 107 are reversed due to the H level output of the NOR circuit 64 for maintaining thereafter the transistor $T_{r1}$ at OFF state and the transistor $T_{r2}$ at ON state. And when the motor 1 is backwardly rotated to return the tap 9 to the original position, the output signal $SG_1$ becomes H level and the output of the flip-flop circuit 107 is reversed for turning the transistor $T_{r2}$ OFF, which in turn suspends the power supplying route for driving the motor 1 backwardly. The NAND circuit 81 is input at one input terminal thereof the output signal $SG_1$ of H level, but the output signal from the NAND circuit 81 is kept at H level because of the output of the OR circuit 80 being at L level. So the flip-flop circuit 84 can not be reversed; the output signal therefrom is maintained at H level for not rendering the transistor $T_{r1}$ ON. Besides, when the output signal $SG_4$ of L level from the overheat sensing circuit C$_3$ once makes the output signal of the flip-flop circuit 78 H level, with the aid of the NOT circuit 75, the OR circuit 76, and the NOR circuit 77, the flip-flop circuit 78 keeps that condition. It can be reversed only when the tap 9 is returned to the original position and the motor 1 is cooled to turn the output signal SG$_4$ to H level followed in addition by depressing of the starting switch 36. In the case when the output signal SG$_4$ becoming L level in the midway of the tap 9 descending and the output signal SG$_4$ becoming H level in the midway of the tap 9 ascending, the next working cycle of machining is prevented from being commenced.

As described above in greater detail, the motor 1 is not halted or stopped immediately when an overheating phenomenon takes place. It can be stopped when the tap 9 has finished the current working cycle of tapping, i.e., the working cycle just in progress, and been returned to the original position. Furthermore, as the output signal SG$_1$ renders the transistor T$_{r3}$ turn ON or OFF by way of the NOT circuits 158, 157, the normal open contact CR$_{3a}$ of the relay CR$_3$ is thereby caused to be opened or closed. So the output signal of the same can be taken out for being delivered outside by way of the connecting wire 169 according to the opening and closing of the normal open contact CR$_{3a}$. In addition, it is also possible to count the number of finished articles by commanding the electromagnetic counter 162 to do so, according to the opening and closing of the normal open contact CR$_{2d}$ of the relay CR$_2$, because the same can be opened and closed by the operation of the transistor T$_{r2}$.

When a single operation cycle of the tapping machine is desired by means of turning the rotary switch 31 to the contact for single operation 31b, all of the processes are the same as in the repeating operation cycle from the starting of the motor 1 to the backward rotation thereof, excepting only the input conditions to the OR circuit 71 and the NAND circuit 74, that is to say, the contact for repeating operation 31a input H level signal and the contact for single operation 31b L level signal. When the flip-flop circuit 107 is reversed for changing the rotational direction of the motor 1 to backward the output signal SG$_3$ becomes H level before being input to the NAND circuit 74. Then the NAND circuit 74 outputs an L level output signal for reversing the output of the flip-flop circuit 78 from L level to H level. The output of the flip-flop circuit 84, through the OR circuit 80 and the NAND circuit 81, remains in this case at H level. The motor 1 therefore remains stationary without entering again a forward rotation, after having finished the backward rotation in that cycle. This ensures the tapping machine to be able to carry out a single operation. If and when the motor 1 enters thereafter an overheating condition during the single operation, it can not be put in a driven state again, although the cycle in progress is continued to an end, until it is cooled enough, regardless of a depressing of the starting switch 36, because the output signal SG$_4$ of L level keeps the output of the flip-flop circuit 78 to H level.

If the rotary switch 31 is turned to the contact for inching operation 31c for commanding the tapping machine an inching motion, an output of H level is input to the NAND circuits 92, 97 from the NOT circuit 94. And at the moment of depressing the starting switch 36 the output of the NAND circuit 92 turns to L level. However, the output therefrom is delayed, because of existence of the integration circuit consisting of the resistor 95 and the capacitor 95a, by the time constant of the integration circuit. The output is continued to be at H level just for the delayed time. The NAND circuit 97 consequently continues to output the signal of L level for the delayed time for keeping the OR circuit 112 to output an H level signal. It continues to keep the transistor T$_{r1}$ ON for the delayed time. The motor 1 is therefore forwardly rotated to slightly descend the tap 9. If a further descending of the tap 9 is desired the starting switch 36 has to be released of depressing once before being depressed again anew. The tap 9 is descended a little by the forward movement of the motor 1 for a certain preset duration of time. Repetition of depressing several times of the starting switch 36 will descend the tap 9 to a desired position. In this instance the motor 1 can not be stopped while the tap 9 is in the course of descending, because the output of the flip-flop circuit 78 is not reversed notwithstanding the output signal SG$_4$ being at L level.

For returning the tap 9 to the original position, after it has been descended as far as a desired position, depressing of the emergency return switch 38 will be enough. When that switch is turned OFF, the flip-flop circuit 107 is reversed to turn the transistor T$_{r2}$ ON; then the motor 1 is backwardly rotated to ascend the tap 9. When the tap 9 is returned to the original position, the output signal SG$_1$ becomes H level, as stated earlier, to reverse the flip-flop circuit 107. It results in turning the transistor T$_{r2}$ OFF, followed by halting of the motor 1.

When the rotary switch 31 is turned to the contact for interlocking operation 31d, which is interlocked with other machine(s) for receiving signals therefrom, the output of H level from the NOT circuit 99 is input to the NAND circuit 98. When a control signal of H level is input, owing to an external signal from other machine or machines, which is a closing operation of the contact 165 in this embodiment, to the other input terminal of the NAND circuit 98, the output of the NAND circuit 98 becomes L level for inputting a H level signal to the NAND circuit via the OR circuit 80. The motor 1 is forwardly rotated by this. It means that the tapping machine can be synchronously driven under control with other machine(s), due to the output signal from the NAND circuit 98, a different route from the case of the aforementioned repeating operation cycle through the flip-flop circuit 78, that is, due to a signal from outside.

In this embodiment the pitch or distance between the holes 23 of the first group G$_1$ and that between the holes 25 of the third group G$_3$ are made smaller than that between the holes 24 in the second group G$_2$, so the amount of movement calculated in the down counter 51 becomes greater than the actual amount of movement. This is helpful in preventing the tap 9 from possibly overrunning by inertia, when the motor 1 is reversed in its driving direction from forward to backward, to form a deeper tapped hole than the predetermined value.

Although the moving speed of the tap 9 is set identical in either of advancing and returning, it can be modified, for example, the returning speed can be made faster than the advancing speed for shortening the time of a working cycle of the tap 9, by means of varying the number of magnetic poles of the motor 1 in the two ways. It is possible, for example, to operate the motor 1 with eight poles in the advancing operation thereof and with four poles in the returning operation to make the returning speed faster than the advancing speed.

As described above in greater detail this invention can provide an excellent safety device for a tapping machine which is capable of sensing a state of a motor transiting or passing to an overheating condition to prevent the temperature from rising beyond the value resistible for the motor, and further capable of making the tapping machine finish the current operation of the working cycle, even when an overheating has taken place in the course of a tapping operation, before suspending another working cycle for protecting the motor from any trouble caused by the overheating.

What is claimed is:

1. A tapping machine comprising:

a frame;

a quill reciprocatively mounted on said frame;

a spindle rotatably mounted in, and reciprocated with, said quill, carrying a screw tap at one end thereof;

driving means including a reversible electric motor and operatively connected to said quill so as to move said quill in advance and retractive direction, and operatively connected to said spindle so as to rotate said spindle in forward and backward direction;

position sensing means for generating a sensing signal when said quill has arrived at a predetermined position in advance-movement thereof;

a driving circuit connected to said driving means for performing a working cycle, in which said quill advances and said spindle forwardly rotates before the generation of the sensing signal from said position sensing means, and then said quill retracts to a start position thereof and said spindle backwardly rotates after the generation of the sensing signal from said position sensing means;

temperature sensing means for generating a sensing signal while the temperature of said motor is more than a predetermined value; and control means connected to said driving circuit for continuing operation of said driving means until the current working cycle is finished notwithstanding the generation of the sensing signal from said temperature sensing means in advance-movement of said quill, and for preventing operation of said driving means for next working cycle until the generation of the sensing signal from said temperature sensing means is ceased.

2. A tapping machine according to claim 1, wherein said temperature sensing means includes a thermal relay disposed in said motor.

3. A tapping machine according to claim 1, wherein said temperature sensing means includes a resistor for temperature sensing disposed in said motor.

4. A tapping machine according to claim 1, wherein said temperature sensing means includes a thermister disposed in said motor.

5. A tapping machine according to claim 1, wherein said temperature sensing means includes a thermocouple disposed in said motor.

6. A tapping machine according to claim 1, wherein said control means comprises:

a circuit for generating a starting signal to start a working cycle;

a circuit for generating a reversing signal, being connected to said position sensing means to receive a signal therefrom, so as to reverse the rotational direction of said electric motor from forward to backward;

a circuit for discriminating the permissibility of starting the motor, being connected to the starting-signal-generating circuit and said temperature sensing means, so as to output a signal from the starting-signal-generating circuit only when said sensing signal is not generated from said temperature sensing means;

a circuit for maintaining generation of a forward-rotation signal which continues to generate, upon receiving the output from the discriminating circuit, the forward-rotation signal to said driving circuit and to stop the output of said forward-rotation signal when it receives a signal from the reversing-signal-generating circuit; and a circuit for maintaining generation of a reverse-rotation signal which continues to generate, upon receiving the reverse-rotation signal output from the reversing-signal-generating circuit, the reverse-rotation signal to said driving circuit and to stop the output of said reverse-rotation signal when the working cycle has been finished.

7. A tapping machine according to claim 6, wherein the forward-rotation-maintaining circuit is a flip-flop circuit, to one input terminal thereof being connected the discriminating circuit, to the other input terminal thereof being connected the reverse-rotation-signal-generating circuit and the output terminal thereof being connected to said driving means.

8. A tapping machine according to claim 6, wherein the reverse-rotation-signal-maintaining circuit is a flip-flop circuit, to one input terminal thereof being connected the reverse-rotation-signal-generating circuit, to the other input terminal thereof being connected said position sensing means and the output terminal thereof being connected to said driving circuit.

9. A tapping machine according to claim 6, wherein the discriminating circuit is a flip-flop circuit, to one input terminal thereof being connected the starting-signal-generating circuit, to the other input terminal being connected said temperature sensing means, and the output terminal thereof being connected to the forward-rotation-signal-maintaining circuit.

* * * * *